United States Patent [19]

Lusk

[11] 4,315,699

[45] Feb. 16, 1982

[54] MULTIWEDGE CONNECTOR

[75] Inventor: George E. Lusk, Woodstock, Ill.

[73] Assignee: Joslyn Mfg. and Supply Co., Chicago, Ill.

[21] Appl. No.: 576,731

[22] Filed: May 12, 1975

[51] Int. Cl.³ .......................... H01B 17/02; F16B 2/00
[52] U.S. Cl. .................................... 403/361; 174/179
[58] Field of Search ............... 403/361, 269, 268, 265, 403/305, 306, 308, 314, 365, 375, 267; 174/176, 177, 178, 179, 186, 79

[56] References Cited

U.S. PATENT DOCUMENTS

| | | | |
|---|---|---|---|
| 2,404,385 | 7/1946 | Fritts | 403/365 X |
| 2,468,985 | 5/1949 | Krotz | 403/365 X |
| 2,475,741 | 7/1949 | Goeller | 403/308 |
| 3,362,731 | 1/1968 | Gasche et al. | 403/361 X |
| 3,499,129 | 3/1970 | Hulteen et al. | 174/179 X |
| 3,549,791 | 12/1970 | Yonkers | 174/179 |
| 3,551,959 | 1/1971 | Mastalski | 403/265 X |
| 4,051,929 | 10/1977 | Parfitt . | |

FOREIGN PATENT DOCUMENTS 451448 10/1927 Fed. Rep. of Germany .
681550 10/1952 United Kingdom ................ 403/267

Primary Examiner—Werner H. Schroeder
Attorney, Agent, or Firm—Mason, Kolehmainen, Rathburn & Wyss

[57] ABSTRACT

A connector for high tensile load attachment to an elongated rod, such as a resin bonded, glass reinforced rod, includes a high strength, elongated, metal cylindrical retainer having an internal shoulder formed at one longitudinal end and a plurality of outer peripheral threads formed at the other longitudinal end for the threaded attachment of a hook or other load bearing device. The connector further includes a plurality of metal collets or rings, whose inner peripheral profile configurations are that of a pair of truncated cones placed base-to-base, serially, longitudinally received within the retainer. An organic potting compound, for example an epoxy resin, is poured into the space between the rod and the collets and is allowed to cure.

76 Claims, 10 Drawing Figures

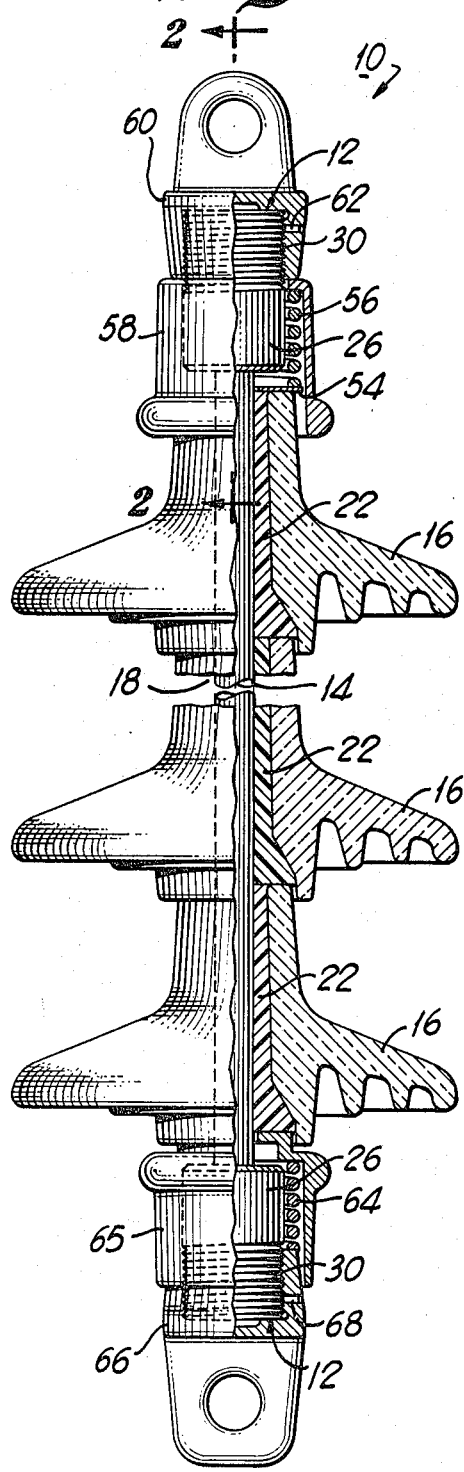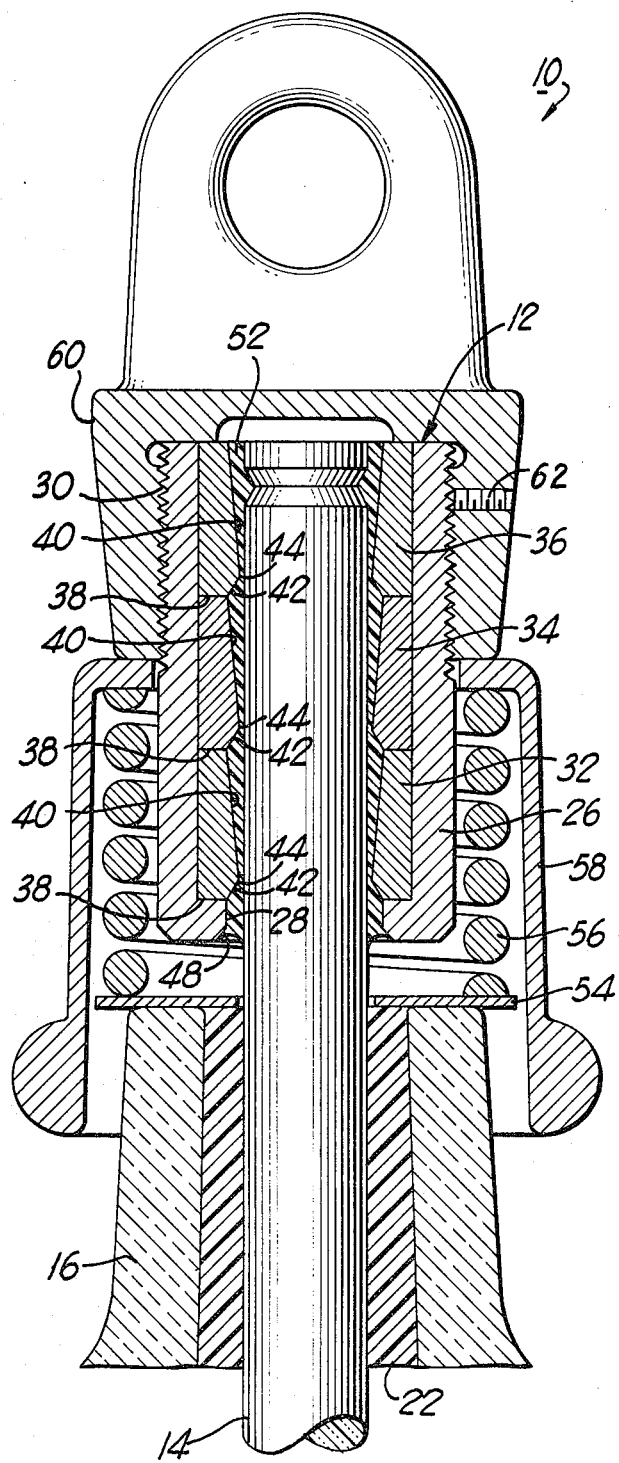

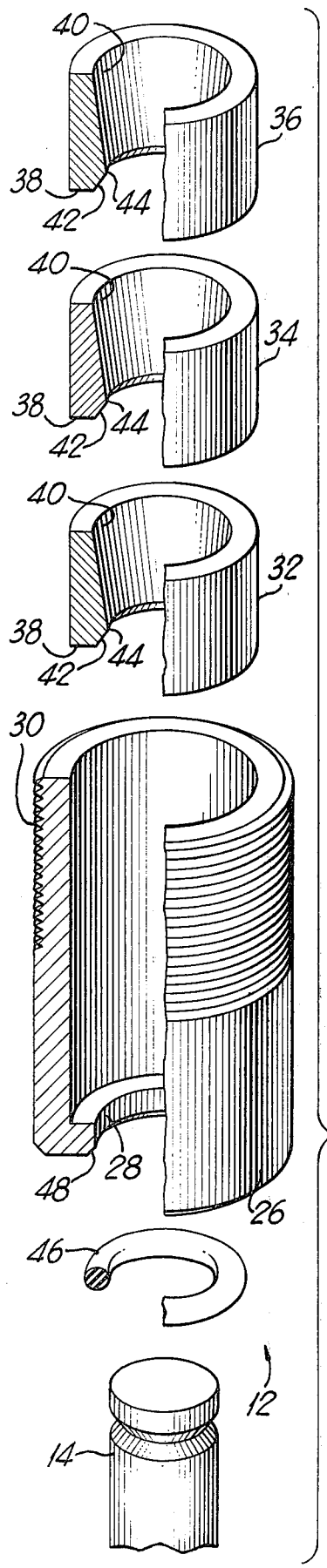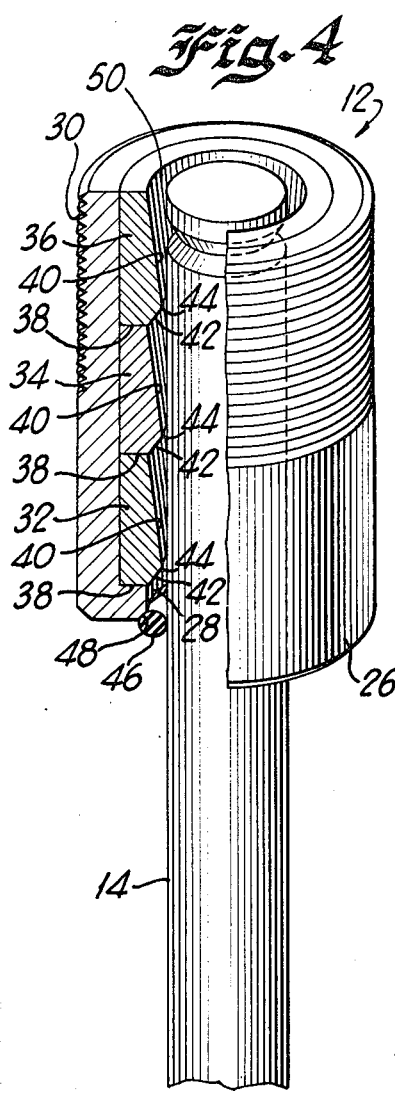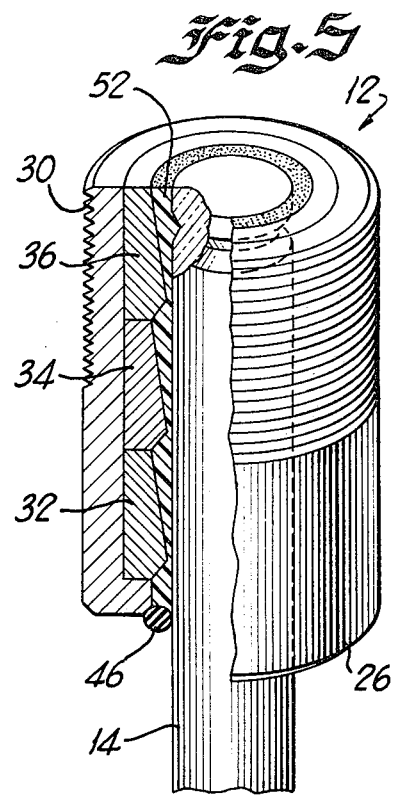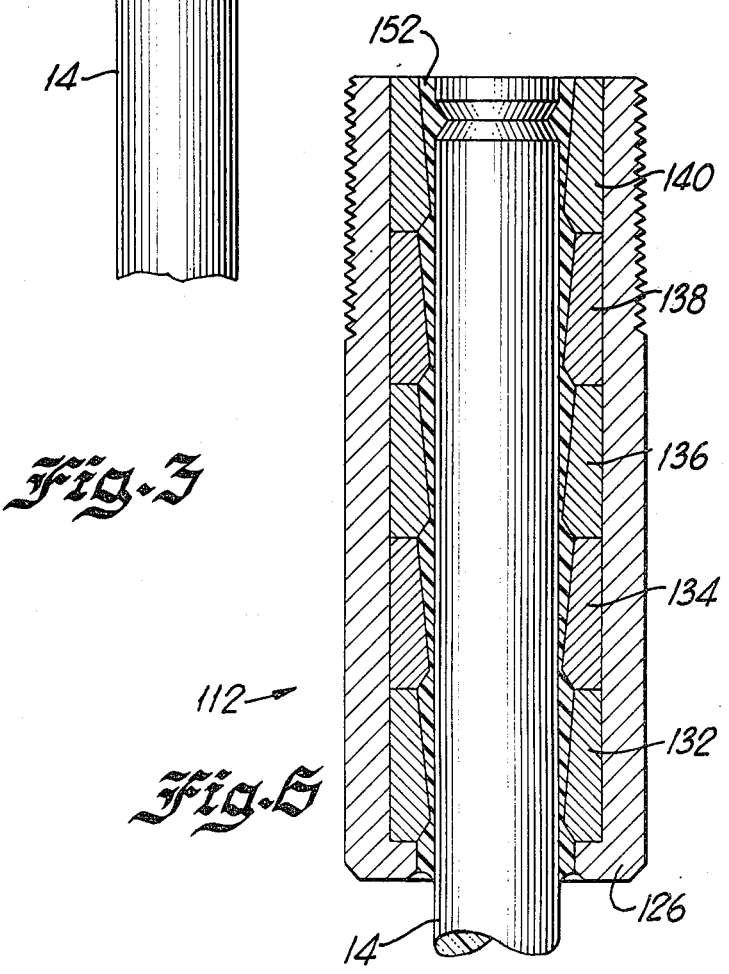

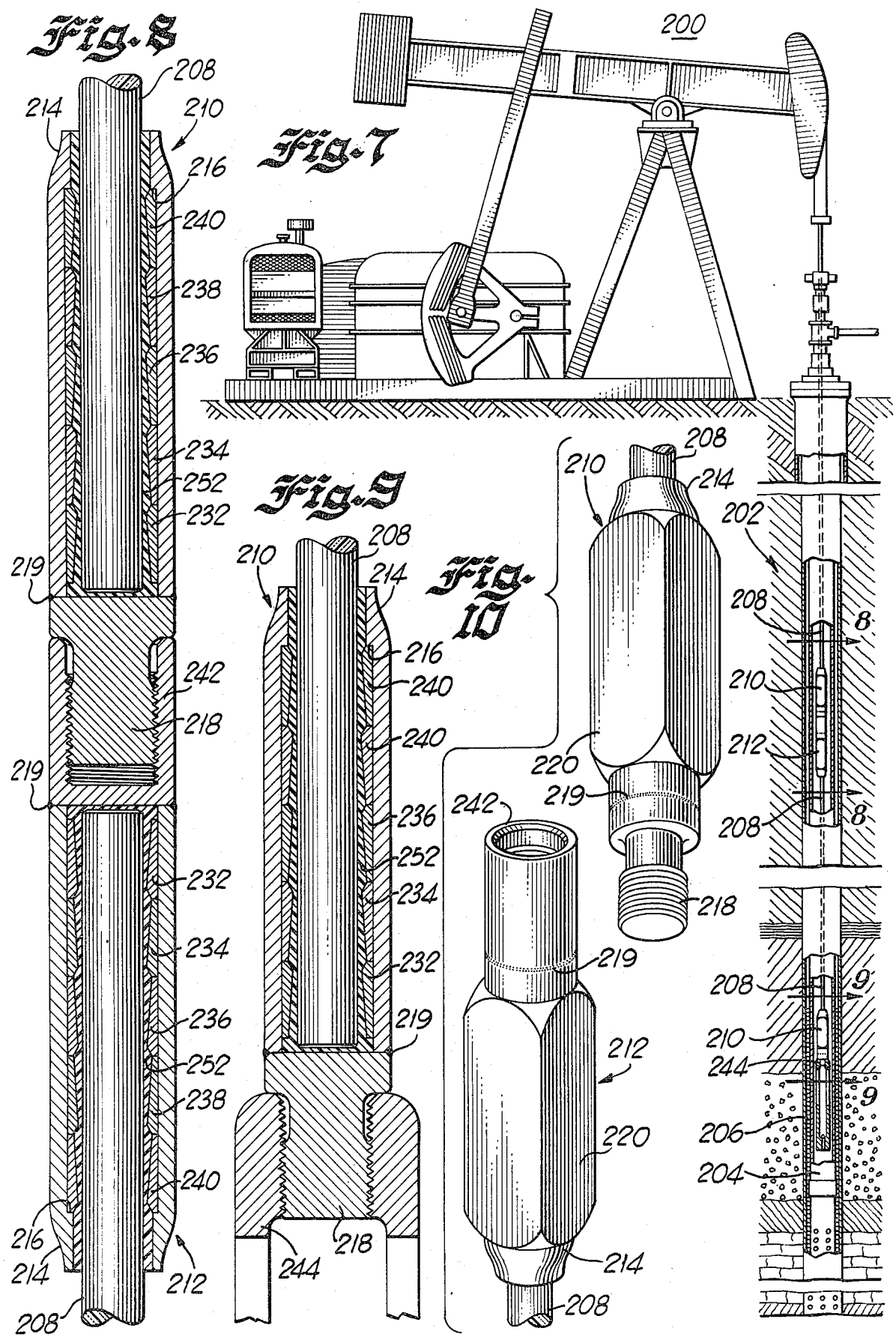

MULTIWEDGE CONNECTOR

BACKGROUND OF THE INVENTION

A. Field of the Invention

The device of the present invention relates generally to a new and improved connector for high tensile load attachment to an elongated element, such as a resin bonded, glass reinforced rod, to a new and improved method for maintaining a high tensile load attachment to an elongated element, to a new and improved suspension insulator, to a new and improved method for manufacturing suspension insulators, to a new and improved sucker rod and to a new and improved method for actuating a remotely located pump.

B. Description of the Prior Art

There is a need unfulfilled by prior art devices for low cost elongated rods and end fittings or connectors for these rods capable of carrying high tensile loads. In many geographical locations, there are wide variations in both temperature and environmental conditions. In these locations, prior art connectors that are capable of carrying high tensile loads are technically or economically undesirable.

A specific example of a common connector of this type is the end fitting used in rod type suspension insulators to support or suspend high voltage power cables from transmission towers. Due to the very high tensile loads and large temperature variations, these prior art end fittings tend to exert excessive shear stresses on the rod or suffer a change in the physical characteristics of the materials that form the end fittings.

One type of prior art fitting employs a cylindrical metal sleeve placed between compression dies and compressed about the end of a rod. An example of this type of prior art fitting is disclosed in U.S. Pat. No. 3,192,622. Such fittings tend to be excessively long and to creep upon being subjected to high tensile loads and high temperatures.

Another example of a typical prior art fitting is the fitting employing a metal wedge set forth in U.S Pat. No. 3,698,749. This type of fitting is costly to produce and tends either to spot load the rod or to lose its shear strength at the interface between the wedge and the rod.

Other common prior art end fittings are expensive to manufacture and require large amounts of potting material between the end fitting and the rod, thus making the suspension insulator more susceptible to failure upon being exposed to temperature and environment variations. These characteristics reduce the capability of prior art suspension insulators to achieve high tensile loading.

Furthermore, there is a need for low cost, lightweight, rigid rods and interconnections between adjacent rods for actuating remotely located pumps, such as oil well pumps. When the oil pressure in an oil field has fallen to a point where the oil is not naturally lifted to the surface, artificial means must be used to lift the oil to the surface. One artificial means is an oil well pump placed at the bottom of the oil well and actuated by a plurality or string of rods, commonly referred to as a sucker rod string. A typical sucker rod string includes a plurality of steel rods having lengths of between 25 and 30 feet and diameters of $\frac{1}{2}$, $\frac{5}{8}$, $\frac{3}{4}$, $\frac{7}{8}$, 1 or $1\frac{1}{2}$ inches interconnected by threaded couplings. A typical pumping unit including a typical sucker rod string is fully disclosed and discussed in a reference book entitled PRIMER OF OIL AND GAS PRODUCTION (1971), published by the American Petroleum Institute. See particularly Chapter 5, pages 23–26. In addition, the special problems encountered in this method of oil production are discussed in Chapter 10.

Typical steel sucker rods must be replaced at rather frequent intervals due to corrosion. Many attempts have been made to reduce corrosion or the effects of corrosion. For example, plastic coatings have been developed for application to metal surfaces to protect the metal surfaces from corrosion. In many low pressure systems, plastic pipe is being used as a substitute for steel pipe to reduce corrosion problems. However, the plastic pipe typically does not have the same strength as the metal pipe. For all of the above reasons, a need exists for corrosion resistant, high tensile strength sucker rod strings for use in pumping oil to the surface.

SUMMARY OF THE INVENTION

An object of the present invention is to provide a new and improved device for high tensile load attachment to a rod or the like.

Another object of the present invention is to provide a new and improved suspension insulator.

Another object of the present invention is to provide a new and improved method of achieving high tensile load attachment to an elongated element.

Another object of the present invention is to provide a new and improved method of manufacturing a suspension insulator capable of being subjected to high tensile loads.

Another object of the present invention is to provide a new and improved end fitting for an elongated rod amenable to low cost, high volume manufacture.

Another object of the present invention is to provide a new and improved device and method for actuating a remotely located pump.

Another object of the present invention is to provide a new and improved sucker rod.

Another object of the present invention is to provide a new and improved sucker rod string.

Briefly, the present invention is directed to a new and improved end fitting or connector for the high tensile load attachment to an elongated element, such as the rod of a suspension insulator or a sucker rod. The connector includes a high-strength, elongated, metal cylindrical retainer having an internal shoulder formed at one longitudinal end and a plurality of peripheral threads formed at the other longitudinal end for threadedly engaging a suitable load bearing attachment.

In accordance with an important feature of the present invention, the connector includes one or more metal collets or rings having inner peripheral profile configurations of a pair of truncated cones positioned base-to-base. The collets are stacked within or serially disposed along the longitudinal axis of the retainer and about the rod such that the lowermost collet abuts against the internal shoulder of the retainer. A suitable organic potting compound of an engineering grade, such as an epoxy resin, is poured between the collets and rod and is held therein by an elastomeric O-ring seal disposed exteriorly of the retainer. When the compound has cured or hardened, the O-ring seal may be removed and a suitable load bearing attachment may be secured to the threaded end of the retainer.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a fragmentary, elevational view of a suspension insulator having end fittings or connectors constructed in accordance with the principles of the present invention;

FIG. 2 is an enlarged, cross-sectional view of a portion of the device of the present invention taken along line 2—2 of FIG. 1.

FIG. 3 is an enlarged, exploded, fragmentary, elevational view of the device of the present invention illustrated in FIG. 1;

FIG. 4 is an enlarged, fragmentary, elevational view of the assembled device of the present invention prior to the insertion of a suitable potting compound;

FIG. 5 is a fragmentary, elevational view of the assembled device of the present invention, similar to the view of FIG. 4, after the insertion of the potting compound;

FIG. 6 is an enlarged, cross-sectional view of an alternative embodiment of the device of the present invention;

FIG. 7 is a partially elevational and partially cross-sectional diagrammatic view of an alternate embodiment of the device of the present invention used in a pumping unit;

FIG. 8 is an enlarged, fragmentary, cross-sectional view of a portion of the device of FIG. 7 taken along line 8—8 of FIG. 7;

FIG. 9 is an enlarged, fragmentary, cross-sectional view of another portion of the device of FIG. 7 taken along line 9—9 of FIG. 7; and FIG. 10 is an enlarged, fragmentary, perspective view of a portion of the device of FIG. 7.

DESCRIPTION OF THE PREFERRED EMBODIMENT

With reference to FIGS. 1-5 of the drawings, there is illustrated a new and improved suspension insulator 10 including a new and improved end fitting or connector 12, construction in accordance with the principles of the present invention.

The insulator 10 may be used to suspend high voltage power cables from transmission towers by attaching one longitudinal end of the insulator 10 to an arm of the tower and the other longitudinal end to a high voltage power cable. The insulator 10 includes an elongated suspension element or rod 14 preferably of the resin bonded, glass reinforced type. In the ilustrated form, the insulator 10 includes a plurality of porcelain shells or skirts 16 each having a central bore 18 therethrough. The rod 14 is passed through the bore 18 of one or more of the shells 16 such that shells 16 are axially mounted about rod 14 in a stacked relationship. These spaces between shells 16 and rod 14 are typically filled with an elastomeric filler 22 in a manner well known in the art.

In accordance with an important feature of the present invention, mounted on the ends of rod 14 are a pair of new and improved end fittings or connectors 12. The connectors 12 each include a high-strength metal cylindrical retainer 26 having an internal shoulder 28 formed at one longitudinal end and a plurality of threads 30 formed at the other longitudinal end.

A plurality of metal collets or rings 32, 34 and 36 (FIG. 3), formd in a specific embodiment of a metal such as aluminum, are stacked within and serially disposed along the longitudinal axis of the retainer 26. The collets 32, 34 and 36 are of an annular configuration and are held within the retainer 26 by the internal shoulder 28. The outer peripheries of the collets 32, 34 and 36 may be circular, polygonal or of any desired shape and, in general, should be formed to conform with the inner periphery of the retainer 26.

The inner peripheral profile configurations of the collets 32, 34 and 36 are that of two, base-to-base or abutting, truncated, right circular cones. At least the long tapers or slopes of the longer cones of the collets 32, 34 and 36 may be formed with the same or different inclinations or slope angles or may be otherwise mathematically programmed to achieve optimum results in the attachment of the connector 12 to the rod 14. Preferably, the edge 44 formed by the junction of the cone bases is rounded off to avoid transmission of excessive shear stresses to the rod 14 and the resin 52 upon the application of a tensile load to the connectors 12 and the rod 14. The collets 32, 34 and 36 are coated with suitable lubricants or mold release agents such as molybdenum disulfide, silicone grease or polytetrafluoroethylene prior to assembly to avoid the development of a bond between the collets 32, 34 and 36 and the resin 52.

In assembling or mounting one of the connectors 12 to one of the ends of the rod 14, an elastomeric O-ring seal 46 (FIG. 4) is positioned about the rod 14 and below a groove 48 fabricated on the retainer 26 to a location such that the retainer 26 rests upon the seal 46. In this position, the seal 46 serves to cover and seal the lower open end of the retainer 26. The retainer 26 is then positioned coaxially about the rod 14 and upon the seal 46. Subsequently, the collets 32, 34 and 36 are serially positioned within and along the longitudinal axis of the retainer 26 and about the rod 14.

The space 50 between the inner surfaces of the collets 32, 34 and 36 and the rod 14 is filled with a suitable organic potting compound 52 (FIG. 5) of an engineering grade, for example, an epoxy resin. Once the potting compound 52 has cured or set, the seal 46 may be removed.

In accordance with a specific embodiment of the present invention, a spring support washer 54 is mounted on the upper end of the top shell 16. A loading spring 56 is then placed upon the washer 54 and is housed within an upper spring cover 58. A clevis fitting 60 is threaded onto the threads 30 of the connector 12 to compress the spring 56 and thereby load the top shell 16 against the connector 12. The fitting 60 may be held in place by a set screw 62.

At the lower end of the insulator 10, a loading spring 64 is mounted within a spring cover 65 and about the lower connector 12. A tongue fitting 66 is threaded onto the threads 30 of the lower connector 12 and may be held in place by a set screw 68.

The insulator 10 in its assembled configuration may be mounted on a transmission tower by securing the clevis fitting 60 to an arm of a transmission tower. A high voltage power cable may be suspended from the transmission tower by securing the power cable to the tongue fitting 66, in which case the end fittings 12 and the rod 14 are normally subjected to a very high tensile load.

In accordance with an important feature of the present invention, both the number and the interior profile configurations of the collets may be varied depending upon the particular application of the end fitting 12 and the tensile load. For example, the interior profile configurations of the collets may be mathematically derived or determined to achieve the optimum results under various tensile loads. The number of collets, the slope angles of the cones of the collets and the lengths of the cones and of the collets are variably preselectable and easily manufactured to provide a wide variety of design combinations that may be included in each retainer 26 and end fitting 12.

For example, an alternative embodiment of the present invention includes a connector or end fitting 112 (FIG. 6) having a cylindrical retainer 126 and a plurality of five collets 132, 134, 136, 138 and 140 mounted about the rod 14. The connector 112 would be useful for withstanding higher tensile loads than the connector 12 discussed above. The collects 132, 134, 136, 138 and 140 may be individually die cast or machined and may have different long tapers, such as long tapers of $2\frac{1}{2}$, $3\frac{1}{2}$ and 5 degrees. Thus, compound slope interfaces may be achieved without the need for and the high cost of specialized machining.

In an alternate embodiment of the present invention, an oil pumping unit 200 (FIG. 7) includes a new and improved sucker rod string 202 for actuating a remotely located oil pump 204 used to pump oil 206 to the surface of the earth. The sucker rod string 202 includes a plurality of new and improved sucker rods 208 interconnected by a plurality of connectors or end fittings 210 and 212 (FIGS. 8-10). In a particular embodiment, a string 202 may include two hundred or more sucker rods 208.

In accordance with an important feature of the present invention, each sucker rod 208 is a resin bonded, glass reinforced rod, for example, a polyester resin bonded fiberglass rod. Each rod 208, in a preferred embodiment, is approximately thirty to thirty-five feet in length and is 0.875 inch in diameter. Obviously, rod 208 may be formed in any length and diameter in accordance with the construction of typical steel sucker rods.

In accordance with the further important feature of the present invention, adjacent sucker rods 208 are interconnected by the end fittings 210 and 212 constructed in accordance with the principles of the present invention. The end fitting 210 includes a high-strength metal retainer 214 having an internal shoulder 216 formed at one longitudinal end and a threaded male connector 218 securely affixed, such as by welding, to another longitudinal end of the retainer 214. Preferably, the retainer 214 includes a generally cylindrically shaped inner surface and an elongated polygonally shaped outer surface or body portion 220 to assist in the connection or disconnection of the end fittings 210 and 212 connected to adjacent sucker rods 208.

The end fitting 210 includes a plurality of metal collets or rings 232, 234, 236, 238 and 240 stacked within and serially disposed along the longitudinal axis of the retainer 214. The collets 232, 234, 236, 238 and 240 are held within the retainer 214 by the internal shoulder 216 and are, for all practical purposes, identical in design and assembly to the collets 32, 34 and 36 (FIGS. 2-5) and the collets 132, 134, 136, 138 and 140 (FIG. 6). As described hereinabove, the space between the inner surfaces of the collets 232, 234, 236, 238 and 240 and the rod 208 is filled with a suitable organic potting compound 252 of an engineering grade, for example, an epoxy resin. Once the potting compound 252 is cured or set, the sealing member normally used to cover the open end of the retainer 214 may be removed. Thereafter, the weld 219 is formed to securely attach the retainer 214 to the threaded male connector 218.

The connector 212 is essentially identical to the connector 210 except that it includes a threaded female connector 242 securely affixed to one end portion of a retainer 214 at the weld 219. Thus, adjacent rods 208 may be securely interconnected by the threaded engagement of the connectors 218 and 242. The polygonally shaped body portions 220 of the retainers 214 may be engaged by an operator and suitable tools to facilitate the interconnection of adjacent rods 208 by the connectors 218 and 242.

A suitable connector 244 (FIG. 9) may be used to attach the lowermost sucker rod 208 to the oil pump 204 (FIG. 7) remotely located far beneath the surface of the earth. In this manner, a new and improved pumping unit 200 including a new and improved sucker rod string 202 for actuating a remotely located oil pump 204 is provided.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An end fitting having component parts capable of being assembled for providing an attachment to an elongated member comprising a plurality of collets adapted to be positioned about said member and having a corresponding plurality of uninterrupted interior surfaces adapted to be spaced from said member, elongated means adapted to be positioned about said member for receiving and retaining said plurality of collets about and spaced from said member in a serially disposed, coaxially aligned condition within said elongated receiving and retaining means and along the longitudinal axis of said member, means adapted to be disposed between said plurality of collets and said member for filling substantially all of the spaces or voids between said member and said interior surfaces of said plurality of collets to thereby affix said end fitting to said member and means adapted to coat said interior surface for avoiding the development of a bond between said interior surface and said filling means.

2. An end fitting as defined in claim 1 wherein said elongated receiving and retaining means is cylindrical in shape and includes an integrally formed, inwardly projecting shoulder at one longitudinal end thereof for engaging one of said plurality of collets.

3. An end fitting as defined in claim 2 wherein said elongated receiving and retaining means includes a plurality of integrally formed, exterior threads at the other longitudinal end thereof, opposite from said one longitudinal end.

4. An end fitting as defined in claim 1 wherein said elongated receiving and retaining means comprises a high-strength metal cylinder.

5. An end fitting as defined in claim 1 wherein said filling means comprises an organic potting compound.

6. An end fitting as defined in claim 5 wherein said potting compound comprises an epoxy resin.

7. An end fitting as defined in claim 1 wherein said interior surfaces of at least some of said plurality of collets are configured in the form of a pair of adjacent, base-to-base, truncated cones along the longitudinal axes of said some of said plurality of collets.

8. An end fitting as defined in claim 7 wherein the heights or lengths of said pair of cones of each of said some of said plurality of collets are unequal.

9. An end fitting as defined in claim 8 wherein the inclinations or slant angles of the longer cones of at least two of said some of said plurality of collets are unequal.

10. An end fitting as defined in claim 1 wherein said plurality of collets comprises a plurality of at least three collets.

11. An end fitting as defined in claim 1 wherein said plurality of collets comprises a plurality of at least five collets.

12. An end fitting as defined in claim 1 wherein said means for coating includes a lubricant.

13. An end fitting as defined in claim 1 wherein said means for coating includes a mold release agent.

14. An end fitting as defined in claim 1 wherein said means for coating includes molybdenum disulfide.

15. An end fitting as defined in claim 1 wherein said means for coating includes a silicone grease.

16. An end fitting as defined in claim 1 wherein said means for coating includes polytetraflouroethylene.

17. A suspension insulator comprising
an elongated suspension rod and
a first end fitting affixed to said first longitudinal end of said rod, said end fitting comprising
a plurality of collets positioned about said rod and having a corresponding plurality of uninterrupted interior surfaces spaced from said rod,
elongated means for receiving and retaining said plurality of collets about and spaced from said rod in a serially disposed, coaxially aligned condition within said elongated receiving and retaining means and along the longitudinal axis of said rod
means disposed between said plurality of collets and said rod for filling substantially all of the spaces or voids between said rod and said interior surfaces of said plurality of collets to thereby affix said end fitting to said rod, and
means adapted to coat said interior surface for avoiding the development of a bond between said interior surface and said filling means.

18. A suspension insulator as defined in claim 17 wherein said elongated receiving and retaining means is cylindrical in shape and includes an integrally formed, projecting shoulder at one longitudinal end thereof engaging one of said plurality of collets.

19. A suspension insulator as defined in claim 18 wherein said elongated receiving and retaining means includes a plurality of integrally formed, exterior threads at the other longitudinal end thereof, opposite from said one longitudinal end.

20. A suspension insulator as defined in claim 17 wherein said elongated receiving and retaining means comprises a high-strength metal cylinder.

21. A suspension insulator as defined in claim 17 wherein said filling means comprises an organic potting compound.

22. A suspension insulator as defined in claim 21 wherein said potting compound comprises an epoxy resin.

23. A suspension insulator as defined in claim 17 wherein said interior surfaces of at least some of said plurality of collets are configured in the form of a pair of adjacent, base-to-base, truncated cones along the longitudinal axes of said some of said plurality of collets.

24. A suspension insulator as defined in claim 23 wherein the heights or lengths of said pair of cones of each of said some of said plurality of collets are unequal.

25. A suspension insulator as defined in claim 24 wherein the inclinations or slant angles of the longer cones of at least two of said some of said plurality of collets are unequal.

26. A suspension insulator as defined in claim 17 further comprising a plurality of axially aligned, elongated, insulating shells, each of said plurality of insulating shells having a centrally disposed elongated bore and being mounted about said rod and serially disposed along the longitudinal axis of said rod.

27. A suspension insulator as defined in claim 17 further comprising a second end fitting affixed to a second longitudinal end of said rod, said second end fitting comprising
a second plurality of collets positioned about said rod and having a corresponding plurality of uninterrupted interior surfaces spaced from said rod,
second elongated means for receiving and retaining said second plurality of collets about and spaced from said rod in a serially disposed, coaxially aligned condition within said second elongated and receiving means and along the longitudinal axis of said rod and
second means disposed between said second plurality of collets and said rod for filling substantially all of the spaces or voids between said rod and said interior surfaces of said second plurality of collets to thereby affix said second end fitting to said rod.

28. An end fitting as defined in claim 17 wherein said means for coating includes a lubricant.

29. An end fitting as defined in claim 17 wherein said means for coating includes a mold release agent.

30. An end fitting as defined in claim 17 wherein said means for coating includes molybdenum disulfide.

31. An end fitting as defined in claim 17 wherein said means for coating includes a silicone grease.

32. An end fitting as defined in claim 17 wherein said means for coating includes polytetraflouroethylene.

33. An end fitting having component parts capable of being assembled for providing an attachment to an elongated resin bonded, glass reinforced rod comprising
a plurality of collets adapted to be positioned about said rod and having a corresponding plurality of uninterrupted interior surfaces adapted to be spaced from said rod,
elongated means adapted to be positioned about said rod for receiving and retaining said plurality of collets about and spaced from said rod in a serially disposed, coaxially aligned condition within said elongated receiving and retaining means and along the longitudinal axis of said rod
means adapted to be disposed between said plurality of collets and said rod for filling substantially all of the spaces or voids between said rod and said interior surfaces of said plurality of collets to thereby affix said end fitting to said rod, and
means adapted to coat said interior surface for avoiding the development of a bond between said interior surface and said filling means.

34. An end fitting as defined in claim 33 wherein said elongated receiving and retaining means is cylindrical in shape and includes an integrally formed, inwardly projecting shoulder at one longitudinal end thereof for engaging one of said plurality of collets.

35. An end fitting as defined in claim 34 wherein said elongated receiving and retaining means includes a plurality of integrally formed, exterior threads at the other longitudinal end thereof, opposite from said one longitudinal end.

36. An end fitting as defined in claim 33 wherein said elongated receiving and retaining means comprises a high-strength metal cylinder.

37. An end fitting as defined in claim 33 wherein said filling means comprises an organic potting compound.

38. An end fitting as defined in claim 37 wherein said potting compound comprises an epoxy resin.

39. An end fitting as defined in claim 33 wherein said interior surfaces of at least some of said plurality of collets are configured in the form of a pair of adjacent, base-to-base, truncated cones along the longitudinal axes of said some of said plurality of collets.

40. An end fitting as defined in claim 39 wherein the heights or lengths of said pair of cones of each of said some of said plurality of collets are unequal.

41. An end fitting as defined in claim 40 wherein the inclinations or slant angles of the longer cones of at least two of said some of said plurality of collets are unequal.

42. An end fitting as defined in claim 33 wherein said plurality of collets comprises a plurality of at least three collets.

43. An end fitting as defined in claim 33 wherein said plurality of collets comprises a plurality of at least five collets.

44. An end fitting as defined in claim 33 wherein said means for coating includes a lubricant.

45. An end fitting as defined in claim 33 wherein said means for coating includes a mold release agent.

46. An end fitting as defined in claim 33 wherein said means for coating includes molybdenum disulfide.

47. An end fitting as defined in claim 33 wherein said means for coating includes a silicone grease.

48. An end fitting as defined in claim 33 wherein said means for coating includes polytetraflouroethylene.

49. An end fitting having component parts capable of being assembled for providing an attachment to an elongated resin bonded, glass reinforced rod comprising
elongated means having a predetermined, elongated, interior profile configuration defined by an interior surface adapted to be positioned about and along an elongated end portion of said rod in a spaced-apart relationship for transmitting a tensile force to said rod, said interior profile configuration comprising at least six adjacent, base-to-base truncated cones serially disposed along the longitudinal axis of said elongated transmitting means,
means adapted to be disposed between said interior surface and said rod for filling substantially all of the spaces or voids between said interior surface and said rod to thereby affix said end fitting to said rod, and
means adapted to coat said interior surface for avoiding the development of a bond between said interior surface and said filling means.

50. An end fitting as defined in claim 49 wherein said elongated transmitting means is cylindrical in shape and includes a plurality of exterior threads at one longitudinal end thereof.

51. An end fitting as defined in claim 50 wherein said elongated transmitting means comprises a high-strength metal cylinder.

52. An end fitting as defined in claim 49 wherein said filling means comprises an organic potting compound.

53. An end fitting as defined in claim 52 wherein said potting compound comprises an epoxy resin.

54. An end fitting as defined in claim 49 wherein said means for coating includes a lubricant.

55. An end fitting as defined in claim 49 wherein said means for coating includes a mold release agent.

56. An end fitting as defined in claim 49 wherein said means for coating includes molybdenum disulfide.

57. An end fitting as defined in claim 49 wherein said means for coating includes a silicone grease.

58. An end fitting as defined in claim 49 wherein said means for coating includes polytetraflouroethylene.

59. An end fitting for providing an attachment to an elongated resin bonded, glass reinforced rod comprising
elongated means having a predetermined, elongated, interior profile configuration defined by an interior surface positioned about and along an elongated end portion of said rod in a spaced relationship for transmitting a tensile force to said rod, said interior profile configuration comprising a plurality of adjacent, base-to-base truncated cones serially disposed along the longitudinal axis of said elongated transmitting means,
means disposed between said interior surface and said rod for filling substantially all of the spaces or voids between said interior surface and said rod to thereby affix said end fitting to said rod, and
means coating said interior surface for avoiding the development of a bond between said interior surface and said filling means.

60. An end fitting as defined in claim 59 wherein said means for coating includes a lubricant.

61. An end fitting as defined in claim 59 wherein said means for coating includes a mold release agent.

62. An end fitting as defined in claim 59 wherein said means for coating includes molybdenum disulfide.

63. An end fitting as defined in claim 59 wherein said means for coating includes a silicone grease.

64. An end fitting as defined in claim 59 wherein said means for coating includes polytetraflouroethylene.

65. An end fitting as defined in claim 59 wherein said elongated transmitting means comprises a metal cylinder.

66. An end fitting as defined in claim 59 wherein said filling means comprises an organic potting compound.

67. An end fitting as defined in claim 66 wherein said potting compound comprises an epoxy resin.

68. An end fitting having component parts capable of being assembled for providing an attachment to an elongated rod comprising
elongated means having a predetermined, elongated, interior profile configuration defined by an interior surface adapted to be positioned about and along an elongated end portion of said rod in a spaced-apart relationship for transmitting a tensile force of said rod, said interior profile configuration defining a nonuniform cross-sectional area along the longitudinal axis of said elongated means,
means adapted to be disposed between said interior surface and said rod for filling substantially all of the spaces or voids between said interior surface and said rod to thereby affix said end fitting to said rod, and means adapted to coat said interior surface for avoiding the development of a bond between said interior surface and said filling means.

69. An end fitting as defined in claim 68 wherein said elongated transmitting means comprises a metal cylinder.

70. An end fitting as defined in claim 68 wherein said filling means comprises an organic potting compound.

71. An end fitting as defined in claim 70 wherein said potting compound comprises an epoxy resin.

72. An end fitting as defined in claim 70 wherein said means for coating includes a lubricant.

73. An end fitting as defined in claim 70 wherein said means for coating includes a mold release agent.

74. An end fitting as defined in claim 70 wherein said means for coating includes molybdenum disulfide.

75. An end fitting as defined in claim 70 wherein said means for coating includes a silicone grease.

76. An end fitting as defined in claim 70 wherein said means for coating includes polytetraflouroethylene.

* * * * *

UNITED STATES PATENT AND TRADEMARK OFFICE
CERTIFICATE OF CORRECTION

PATENT NO. : 4,315,699

DATED : February 16, 1982

INVENTOR(S) : GEORGE E. LUSK

It is certified that error appears in the above-identified patent and that said Letters Patent are hereby corrected as shown below:

At column 1, line 50, the word "environment" should be changed to --environmental--.

At column 3, line 46, the word "construction" should be --constructed--.

At column 3, line 54, "ilustrated" should be --illustrated--.

Claim 16, column 7, line 27, "polytetraflouroethylene" should be --polytetrafluoroethylene--.

Claim 32, column 8, line 47, "polytetraflouroethylene" should be --polytetrafluoroethylene--.

Claim 48, column 9, line 44, "polytetraflouroethylene" should be --polytetrafluoroethylene--.

Claim 58, column 10, line 17, "polytetraflouroethylene" should be --polytetrafluoroethylene--.

Claim 64, column 10, line 45, "polytetraflouroethylene" should be --polytetrafluoroethylene--.

UNITED STATES PATENT AND TRADEMARK OFFICE
CERTIFICATE OF CORRECTION

PATENT NO. : 4,315,699
DATED : February 16, 1982
INVENTOR(S) : GEORGE E. LUSK

It is certified that error appears in the above—identified patent and that said Letters Patent are hereby corrected as shown below:

Claim 68, column 10, line 60, "of" should be --to--.

Claim 76, column 12, line 10, "polytetraflouroethylene" should be --polytetrafluoroethylene--.

Signed and Sealed this

Fifth Day of July 1983

[SEAL]

Attest:

Attesting Officer

GERALD J. MOSSINGHOFF

Commissioner of Patents and Trademarks